Patented Jan. 16, 1923.

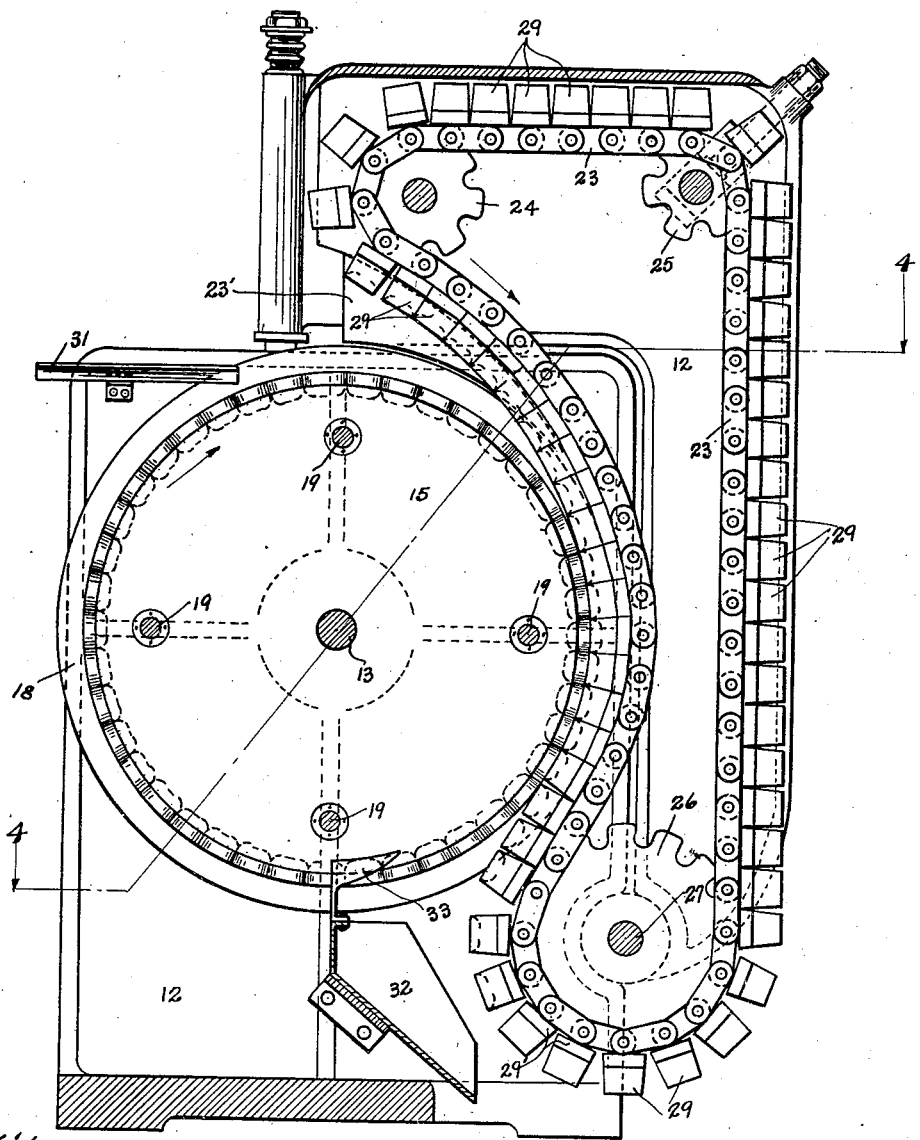

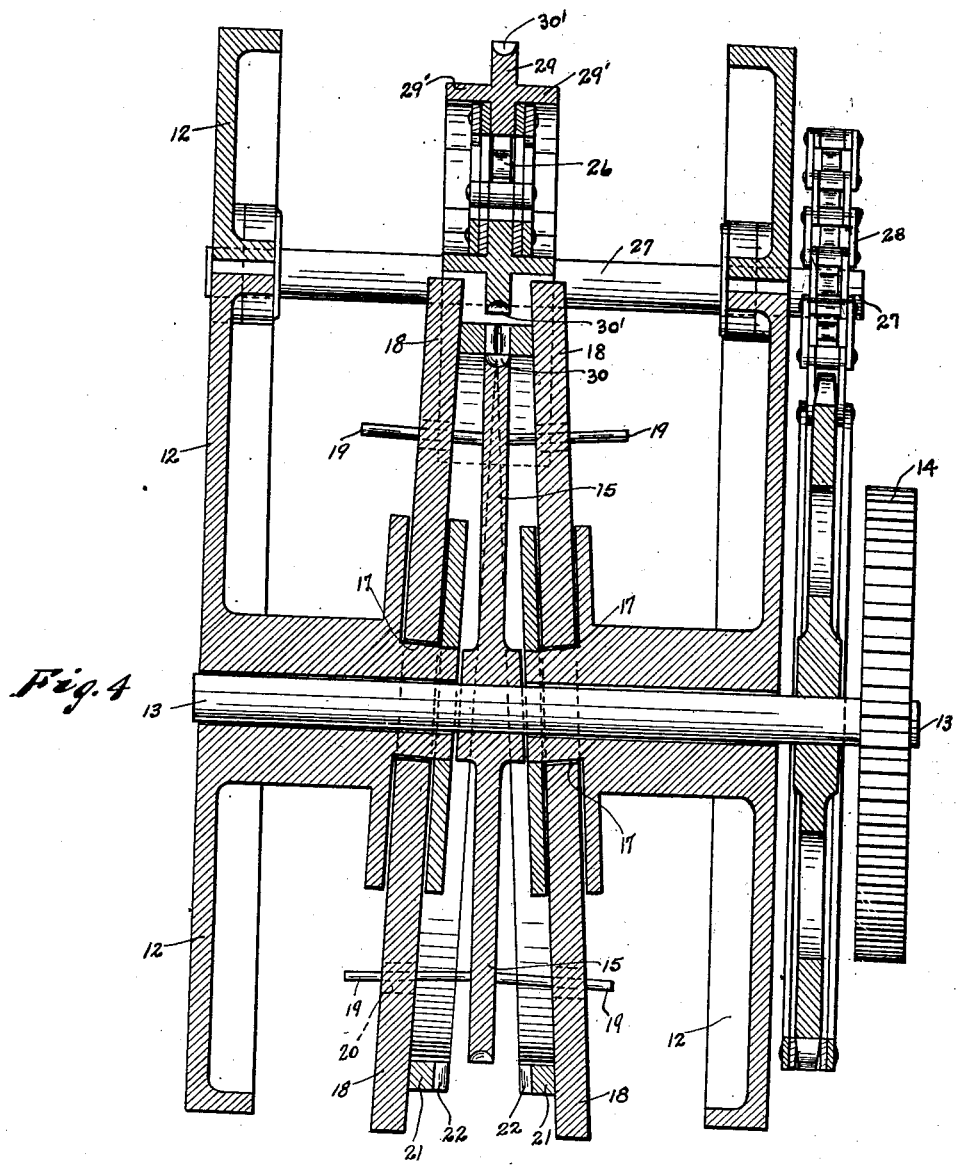

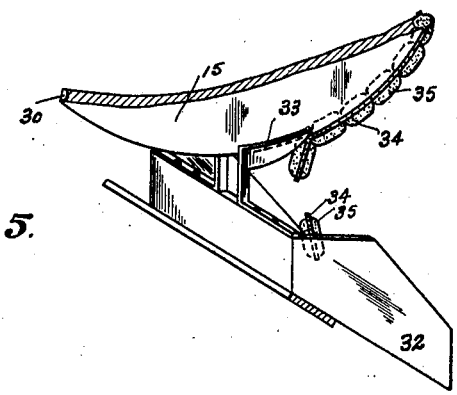
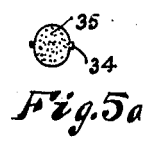
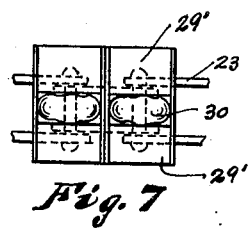
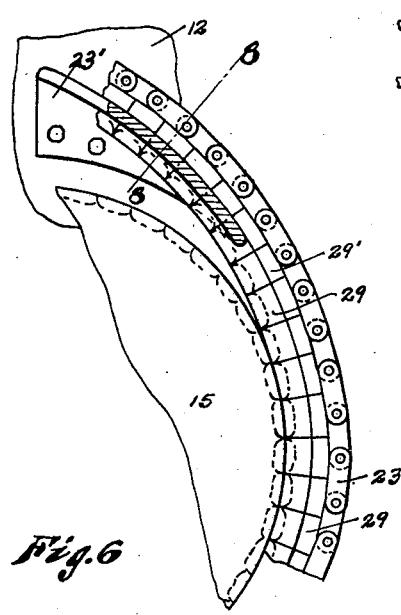
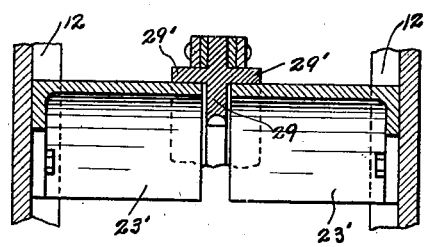

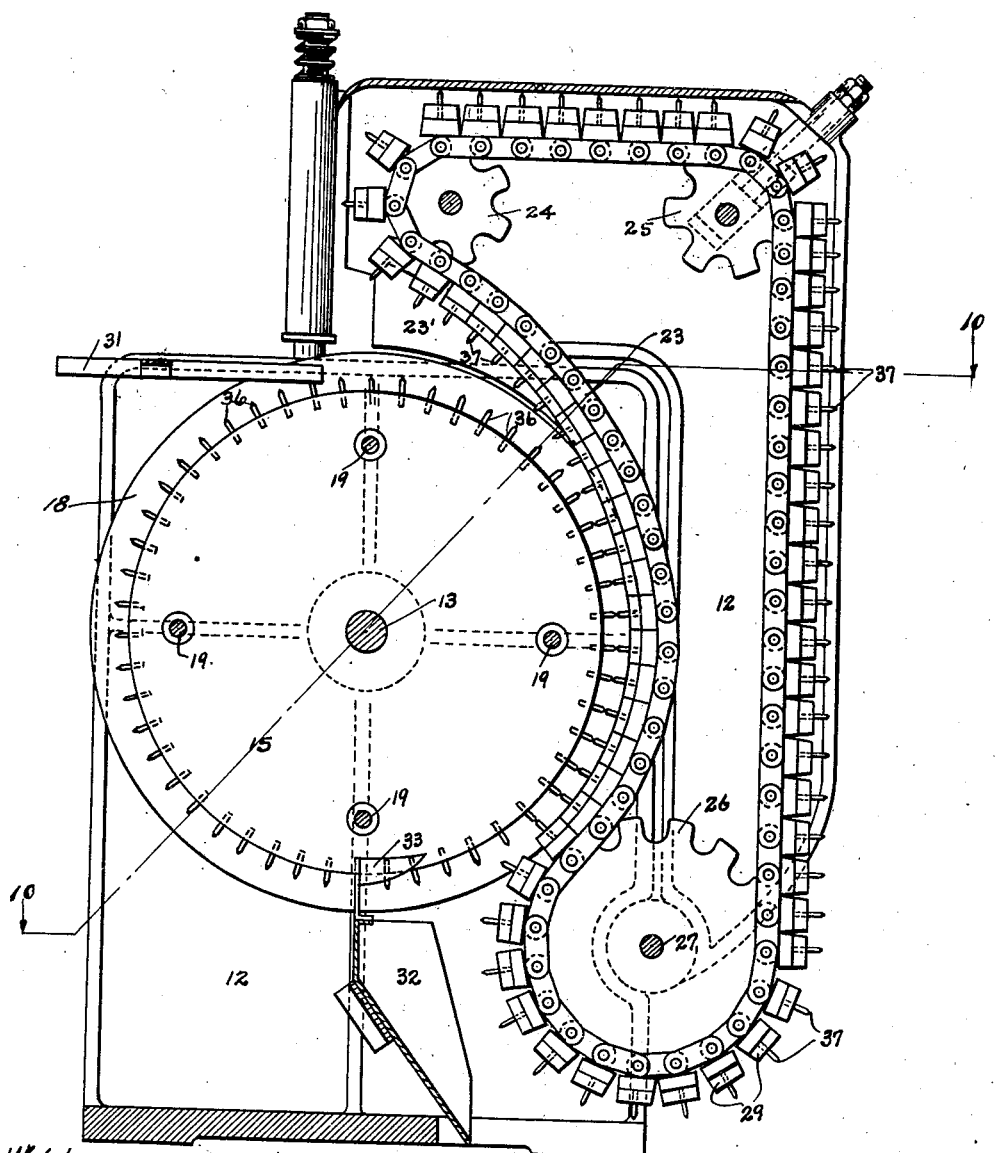

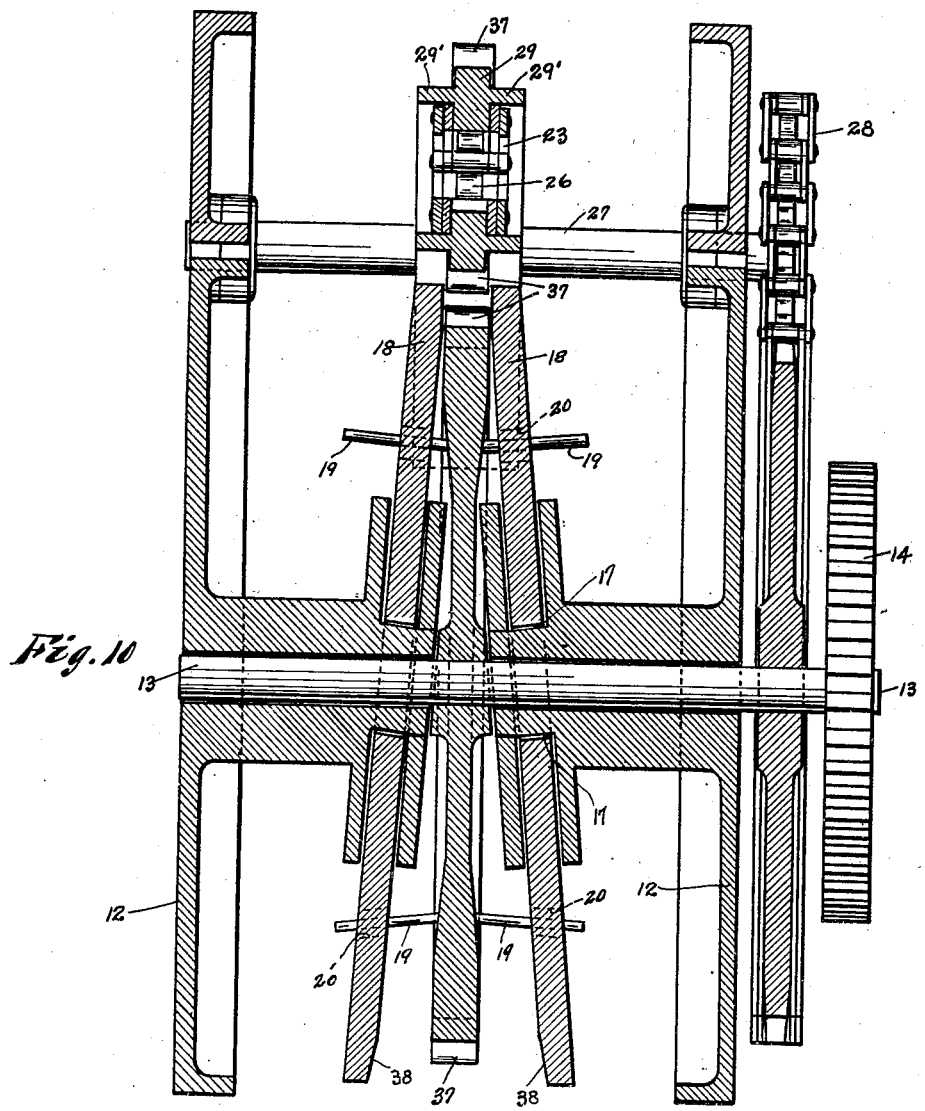

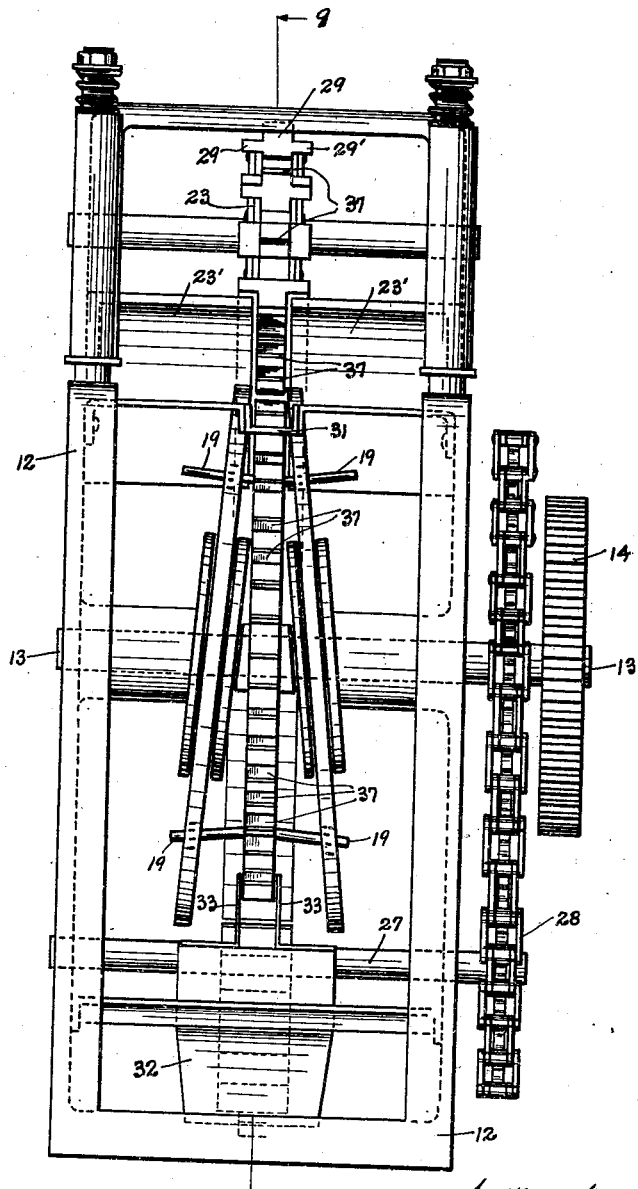

1,442,119

UNITED STATES PATENT OFFICE.

EMIL J. BRACH, OF CHICAGO, ILLINOIS.

MOLDING MACHINE.

Application filed April 2, 1921. Serial No. 457,836.

*To all whom it may concern:*

Be it known that I, EMIL J. BRACH, a citizen of the United States, and a resident of the city of Chicago, county of Cook, and State of Illinois, have invented certain new and useful Improvements in Molding Machines, of which the following is a specification.

My invention relates to new and useful improvements in molding machines and more especially to candy molding machines, the object of the invention being to provide a simple and efficient machine of this character by means of which plastic material such as candy may be readily moulded or formed into various shapes.

Other objects will appear hereinafter.

The invention consists in the combinations and arrangements of parts hereinafter described and claimed.

Figure 1:
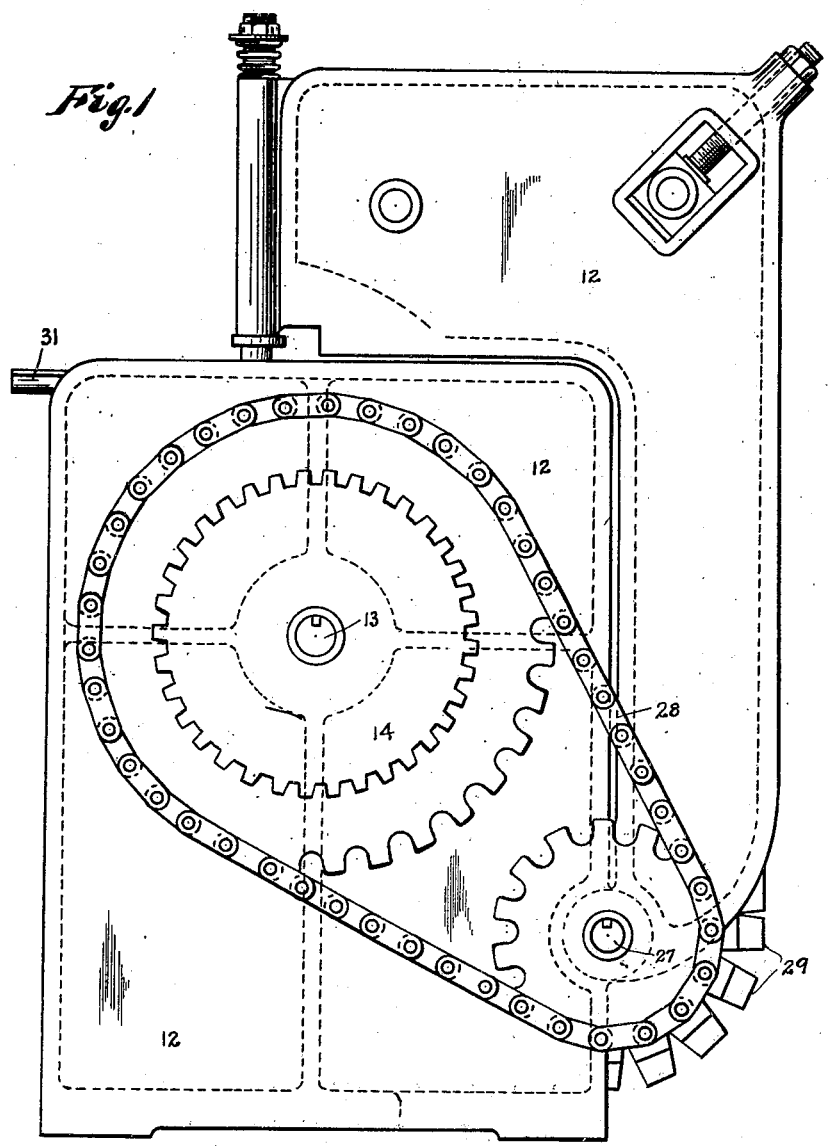
Figure 2:
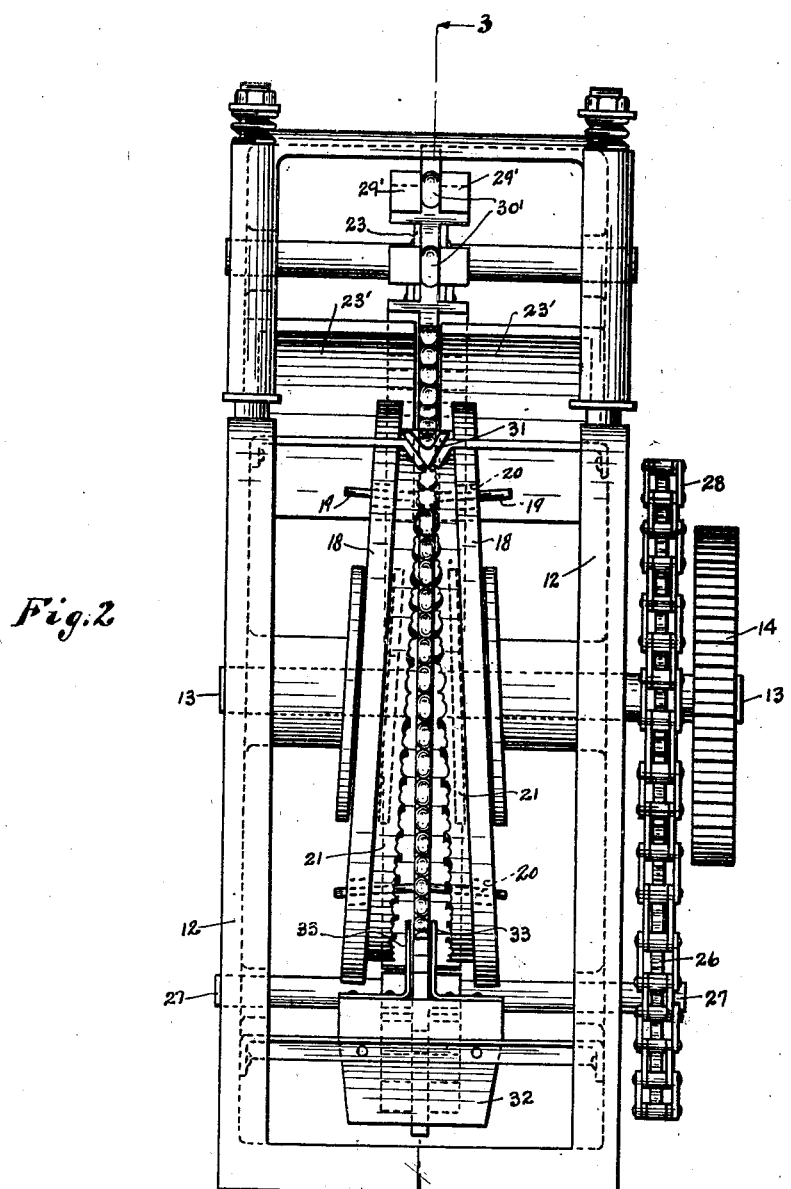

The invention will be best understood by reference to the accompanying drawings forming a part of this specification, and in which, Fig. 1 is a side view of a machine embodying the invention;

Fig. 2, an end view of the same;

Fig. 3, a transverse vertical section of said machine taken substantially on line 3—3 of Fig. 2;

Fig. 4, a section taken substantially on line 4—4 of Fig. 3;

Fig. 5, a detail view of discharging means employed in the machine;

Fig. 5ª, a detail view of a moulded article as discharged from the machine;

Fig. 6, a detail view of a guide employed for guiding a flexible chain conveyor employed in the machine;

Fig. 7, a detail view of a portion of said flexible chain conveyor;

Fig. 8, a section taken on line 8—8 of Fig. 6;

Fig. 9, a section similar to Fig. 3, but showing a modified form of construction, said section being taken substantially on line 9—9 of Fig. 11;

Fig. 10, a section taken substantially on line 10—10 of Fig. 9, and

Fig. 11, an end view corresponding with Fig. 9.

The preferred form of construction as illustrated in Figs. 1 to 8 inclusive of the drawings comprises a suitable frame 12 having an operating shaft 13 extending horizontally therethrough, said shaft being equipped with a driving gear 14 by means of which the same may be driven. The shaft 13 carries a central disk 15 rigidly fixed thereto, said disk being provided on its periphery with a plurality of closely adjacent mould recesses 30 as shown. Suitable bearings 17 are provided on frame 12 on opposite sides of the disk 15, said bearings 17 being arranged at an angle to each other and to the axis of shaft 13 as shown. Disks 18 are arranged to rotate freely on the bearings 17, disks 18 being driven by means of cross bars or pins 19 fixed to the central disk 15 and operating in radial slots 20 in disks 18 and whereby when the disk 15 revolves the disks 18 will also be forced to revolve therewith on bearings 17.

The disks 18 are provided on their inner adjacent faces with annular rings or flanges 21 having mould recesses 22 therein as shown, said mould recesses being adapted and arranged to co-operate with the mould recesses 30 as indicated. The arrangement is such that at one point of their revolution the recesses 22 are brought closely adjacent to each other and to the corresponding recesses 16 to form the bottoms and sides of mould chambers, said recesses 22 widely separated at the diametric opposite point as indicated in Fig. 4.

Co-operating with the disks 15 and 18 is an endless flexible sprocket chain 23 mounted to run over sprocket wheels 24, 25, and 26 so as to be brought into tangential arrangement with the disks 15 at the position of closest approach. The sprocket wheel 26 is mounted on a driving shaft 27 carrying another sprocket connected by chain 28 with a sprocket on shaft 13 and whereby chain 23 is driven at the same linear speed as the peripheries of disks 18. The chain 23 carries a plurality of closely adjacent blocks 29 each provided with a mould recess 30' in its outer face, the mould recesses 30' being adapted and arranged to co-operate with the recesses 30 and 22 to complete a mould, the recesses 30' constituting the tops or outer sides of the moulds. The blocks 29 are provided with lateral flanges 29' adapted to run or ride upon the peripheries of the disks 18 and suitable guides 23' are provided to control the approach of the blocks to said disks. As will be observed, particularly in Figs.

6 and 8, the guides 23' are given substantially the same degree of curvature as the peripheries of the disks and whereby the blocks 29 are caused to gradually approach the periphery of disk 15 and travel in close proximity to each other as they approach the periphery of said disk. In order to permit said blocks to travel around the peripheries of said disks it is necessary to bevel the sides of said blocks as indicated in Fig. 3. If said blocks were caused to approach the peripheries of the disks on a straight line of travel gaps would be formed between said blocks and such gaps would permit the entry of candy thereinto as the same is being moulded. The curvature of the guides 23' closes these gaps and thus prevents such action.

A suitable guide 31 is arranged at the upper left hand corner of Fig. 3 to direct a strip of candy or the like into the machine onto the periphery of disk 15 and under the blocks 29. As the disks revolve and the chain travels in the direction of the arrows indicated in Fig. 3 this strip of candy will be drawn into the moulds forming by the gradual approach of the parts and thus are moulded into the desired shape as imparted to said mould members, said mould members completely closing at the point of closest approach thereof. A discharge trough 32 arranged in the lower portion of the frame 12 in position to receive the moulded pieces of candy or the like which will ordinarily be completely moulded and separated from each other and automatically fall from the machine as the mould sections open immediately above the trough 32. However, in order to prevent any possibility of the moulded sections of candy clinging to the parts, spring discharge plates 33 are arranged on opposite sides of the disk 15 immediately above the trough 32. Although the parts are designed to bring the mould recesses 30 into close proximity to the mould recesses 16, narrow gaps will be left therebetween and these gaps will form side flanges or ears 34 on the sides of the moulded candy pieces 35 and also webs connecting the separate pieces into a string. The discharge springs 33 will engage these side flanges or lips and discharge the candy from the moulds in case there is any sticking or clinging thereof, a result which is facilitated by the said connecting webs.

In use a continuous strip of candy is fed to the machine which continuously cuts or forms the same into separate pieces of desired shape and automatically discharges said pieces from the machine. This continuous operation of the machine prevents the leaving of any ends which would result where separate pieces are fed thereinto. The gradual approach of the molding or cutting elements has a tendency to gradually form the candy strip into the separate pieces and thus causes the flow of any soft filling in the candy strip into the main body of the pieces being formed and away from the lines of separation thus tending to prevent the oozing out of such soft centers. The arrangement is such as to effect comparatively long contact or close approach of the mould sections which gives time for the candy to set in the form imparted to it which greatly improves the appearance thereof and also greatly facilitates the discharge.

In the modified form of construction illustrated in Figs. 9 to 11 inclusive the mould members are formed by knife blades 36 projecting radially from the periphery of disk 15 and co-operating with similar knife blades 37 projecting from the blocks 39. The sides of the disks 18 are provided with bevelled molding surfaces 38 and whereby moulds are formed which will cut a strip of candy into a plurality of blocks which may be made square or rectangular as desired. Otherwise the construction is the same as that already described.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A machine of the class described comprising adjacent members mounted to revolve on axes at an angle to each other; and a traveling flexible member co-operating with said revolving members, substantially as described.

2. A machine of the class described comprising adjacent members mounted to revolve on axes at an angle to each other; co-operating molding members mounted on adjacent faces of said revolving members; and a traveling flexible member co-operating with said revolving members, substantially as described.

3. A machine of the class described comprising adjacent members mounted to revolve on axes at an angle to each other; and a traveling flexible member co-operating with said revolving members at their position of nearest approach, substantially as described.

4. A machine of the class described comprising adjacent members mounted to revolve on axes at an angle to each other; co-operating molding members mounted on adjacent faces of said revolving members; and a traveling flexible member co-operating with said revolving members at their position of nearest approach, substantially as described.

5. A machine of the class described comprising adjacent members mounted to revolve on axes at an angle to each other; co-operating molding members mounted on adjacent faces of said revolving members; an endless chain conveyor co-operating with said revolving members at their position of nearest approach; and molding members on said conveyor co-operating with said revolving member, substantially as described.

6. A machine of the class described comprising two adjacent disks mounted to revolve on axes arranged at an angle to each other; and the mould members mounted on adjacent faces of said disk to be brought into close proximity with each other at the nearest approach of said disk; an endless chain conveyor co-operating with and traveling in close proximity to said mould members at their positions of nearest approach; and mould members on said chain co-operating with the mould members on said disks, substantially as described.

7. A machine of the class described comprising two adjacent discs mounted to revolve on axes arranged on an angle to each other; a central disc operating between said first mentioned discs and having mould recesses formed in and confined to its periphery and adapted and arranged to constitute the inner sides of moulds; mould members mounted on adjacent faces of said angularly arranged discs and adapted and arranged to be brought into close proximity to each other to cooperate with said mould recesses and form the sides of moulds; and an outer travelling member cooperating with and travelling in close proximity to said mould members and arranged to constitute the tops of the moulds formed thereby, substantially as described.

8. A machine of the class described comprising two adjacent disks mounted to revolve on axes arranged at an angle to each other; a central disk operating between said first mentioned disks and having mould members at its periphery; mould members mounted on adjacent faces of said disks to be brought into close proximity of each other at the position of nearest approach of said disk; an endless chain conveyor co-operating with and traveling in close proximity to said mould members at their positions of nearest approach; and the mould members on said chain co-operating with said mould members on said disks, substantially as described.

9. A machine of the class described comprising two adjacent discs mounted to revolve on axes arranged on an angle to each other; a central disc operating between said first mentioned discs and having mould recesses formed in and confined to its periphery and adapted and arranged to constitute the inner sides of moulds; mould members mounted on adjacent faces of said angularly arranged discs and adapted and arranged to be brought into close proximity to each other to cooperate with said mould recesses and form the sides of moulds; an outer travelling member cooperating with and travelling in close proximity to said mould members and arranged to constitute the tops of the moulds formed thereby; and discharging means arranged to contact with moulded articles clinging to the mould recesses in said central disc, substantially as described.

10. A machine of the class described comprising two adjacent disks mounted to revolve on axes arranged at an angle to each other; a central disk operating between said first mentioned disks and having mould members at its periphery; mould members mounted on adjacent faces of said disks to be brought into close proximity of each other at the position of nearest approach of said disk; an endless chain conveyor co-operating with and traveling in close proximity to said mould members at their position of nearest approach; the mould members on said chain co-operating with said mould members on said disks; and discharging means arranged to contact with moulded articles clinging to the mould members in said central disk, substantially as described.

11. A machine of the class described comprising a frame; an operating shaft transversing said frame; a disk secured to said operating shaft and having mould recesses in its periphery; co-operating disks mounted on opposite sides of said first mentioned disk to revolve at an angle thereto; mould members mounted on the adjacent faces of said inclined disks and arranged to be brought into close proximity to each other at the positions of nearest approach of said disks to co-operate with each other and with the mould recesses in the periphery of the central disk; an endless chain conveyor co-operating with and traveling in close proximity to said mould members at their positions of nearest approach; mould members on said chain co-operating with said before mentioned mould members; and a curved guide for said chain having substantially the same curvature as said disks, substantially as described.

12. A machine of the class described comprising a frame; an operating shaft transversing said frame; a disk secured to said operating shaft and having mould recesses in its periphery; co-operating disks mounted on opposite sides of said first mentioned disk to revolve at an angle thereto; mould members mounted on the adjacent faces of said inclined disks and arranged to be brought into close proximity to each other at the positions of nearest approach of said disks to co-operate with each other and with the mould recesses in the periphery of the central disk; an endless chain conveyor co-operating with and traveling in close proximity to said mould members at their positions of nearest aproach; mould members on said chain co-operating with said before mentioned mould members; a curved guide for said chain having substantially the same curvature as said disks; and discharging means arranged to contact with moulded articles clinging to the mould recesses in said central disk, substantially as described.

In testimony whereof I have signed my name to this specification in the presence of two subscribing witnesses.

EMIL J. BRACH.

Witnesses:
JOSHUA R. H. POTTS,
B. G. RICHARDS.